US008180610B2

(12) United States Patent
Blaser et al.

(10) Patent No.: US 8,180,610 B2
(45) Date of Patent: May 15, 2012

(54) MODEL-BASED DIAGNOSTIC INTERFACE FOR A VEHICLE HEALTH MANAGEMENT SYSTEM HAVING A SYSTEM MODEL WITH A SYSTEM NOMECLATURE

(75) Inventors: Robert A. Blaser, Phoenix, AZ (US); Ed Kabbas, Peoria, AZ (US); Mike Boender, Peoria, AZ (US); Gordon Aaseng, Houston, TX (US); Dave Dopilka, Glendale, AZ (US); Elliott Rachlin, Scottsdale, AZ (US); Ronald Quinn, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1933 days.

(21) Appl. No.: 10/682,750

(22) Filed: Oct. 8, 2003

(65) Prior Publication Data

US 2005/0080593 A1 Apr. 14, 2005

(51) Int. Cl.
*G06G 7/48* (2006.01)
*G06F 11/00* (2006.01)

(52) U.S. Cl. ............................................. 703/4; 714/46

(58) Field of Classification Search ......... 703/4; 714/46
See application file for complete search history.

(56) References Cited

U.S. PATENT DOCUMENTS 5,566,092 A 10/1996 Wang et al.
6,950,782 B2 * 9/2005 Qiao et al. .................... 702/183
6,983,200 B2 * 1/2006 Bodin et al. .................... 701/33
2002/0161820 A1 10/2002 Pellegrino et al.
2007/0005202 A1 * 1/2007 Breed ............................ 701/29

FOREIGN PATENT DOCUMENTS

WO WO03/044668 A1 5/2003
WO WO03/073271 A1 9/2003

OTHER PUBLICATIONS

JP Office Action, dated Dec. 1, 2010 for Japanese Patent Application No. 2006-534321.

* cited by examiner

*Primary Examiner* — Paul Rodriguez
*Assistant Examiner* — Nithya Janakiraman
(74) *Attorney, Agent, or Firm* — Ingrassia Fisher & Lorenz, P.C.

(57) ABSTRACT

Methods and apparatus are provided for a model-based diagnostic interface. An apparatus is provided for a diagnostic interface for a system having system data, system information, and a system model having a model nomenclature, the diagnostic interface comprising at least one computational object producing an output responsive to said system data, wherein said at least one object includes a binding of said system data to said system information, wherein said system data is mapped to said model nomenclature before being bound. A method is provided for making a model-based diagnostic interface for a system having system information and system data representing the status of said system, the method comprising the steps of modeling said system to create a system model having a system model nomenclature, mapping said system data into said system model nomenclature, and binding said system data mapped to said system model nomenclature to said system information.

32 Claims, 15 Drawing Sheets

MODEL-BASED DIAGNOSTIC INTERFACE FOR A VEHICLE HEALTH MANAGEMENT SYSTEM HAVING A SYSTEM MODEL WITH A SYSTEM NOMECLATURE

TECHNICAL FIELD

The present invention generally relates to diagnostic systems for telemetered systems. The present invention more particularly relates to diagnostic systems using commercial-off-the-shelf (COTS) diagnostic engines. The invention further more particularly relates to a model-based diagnostic interface between the telemetered system and the COTS diagnostic engines.

BACKGROUND

Integrated Vehicle Health Management Systems (IVHMS) are intended to provide near-real-time corrective responses to component and subsystem anomalies in the complex engineering systems for which they are designed. Corrective responses rely upon diagnostics and prognostics, which are preferably performed in real time to support the near-real-time corrective responses. Real-time automated diagnosis of complicated engineering systems, such as spacecraft, aircraft, and ships, has been an elusive goal.

One element of an IVHMS may be a diagnostic logic, also called a diagnostic engine. Diagnostic engines of various types are known in the art. For example, diagnostic engines that use pass/fail criteria, state machine diagnostic engines, neural net diagnostic engines, and data-mining diagnostic engines are available as COTS products. Some of the types are available from multiple vendors, each having a slightly different interface for input data Various COTS diagnostic engines may each have unique input requirements.

Diagnostic engines are typically used in non-real-time, post-processing applications. Diagnostic engines process inputs which are specifically formatted for the particular diagnostic engine. For example, some diagnostic engines accept only pass/fail indicators, others require formal state variables, still others may take a relational database as an input. Producers of COTS diagnostic engines typically designate the format of the inputs for maximum performance of the COTS diagnostic engine itself. The engines are designed for use in a wide variety of applications with which the COTS diagnostic engine producer is unfamiliar, so tailoring the COTS diagnostic engine to a particular set of available data has been left to the end-user of the COTS diagnostic engine. The expense of providing the data in acceptable input form creates a cost barrier to switching between COTS diagnostic engines, resulting in end-users being uncomfortably reliant on a particular vendor.

Real systems, including systems using an IVHMS, may be telemetered to provide data as to the status of various system elements. The telemetry has a telemetry nomenclature which includes data names, often in mnemonic or abbreviated form, associated with respective data formats, data sources, and similar data attributes. The telemetry nomenclature is typically incompatible with the input requirements of COTS diagnostic engines.

Real systems may further provide data at test points and may provide test data generated during built-in tests or other tests. Test point data may be similar to telemetry but not periodically produced. Test data generally have a test data nomenclature which is incompatible with the input data requirements of COTS diagnostic engines.

The telemetry nomenclature, system model nomenclature, test nomenclature, test point data nomenclature, and the input data requirements for COTS diagnostic engines are uncorrelated and so extensive effort is required to obtain input data for COTS diagnostic engines.

Accordingly, it is desirable to correlate the telemetry nomenclature, the systems model nomenclature, the test nomenclature, and the test point nomenclature to provide inputs to COTS diagnostic engines in a way that does not require extensive effort. It is also desirable to provide an interface between the correlated nomenclature data and one or more COTS diagnostic engines.

BRIEF SUMMARY

An apparatus is provided for a diagnostic interface for a system having system data representing a status of said system, system information relating to relationships within said system, and having a system model having a model nomenclature, the diagnostic interface comprising at least one computational object producing an output responsive to said system data, wherein said at least one object includes a binding of said system data to said system information, wherein said system data is mapped to said model nomenclature before being bound.

A method is provided for making a model-based diagnostic interface for a system having system information and system data representing the status of said system, the method comprising the steps of modeling said system to create a system model having a system model nomenclature and mapping said system data into said system model nomenclature.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
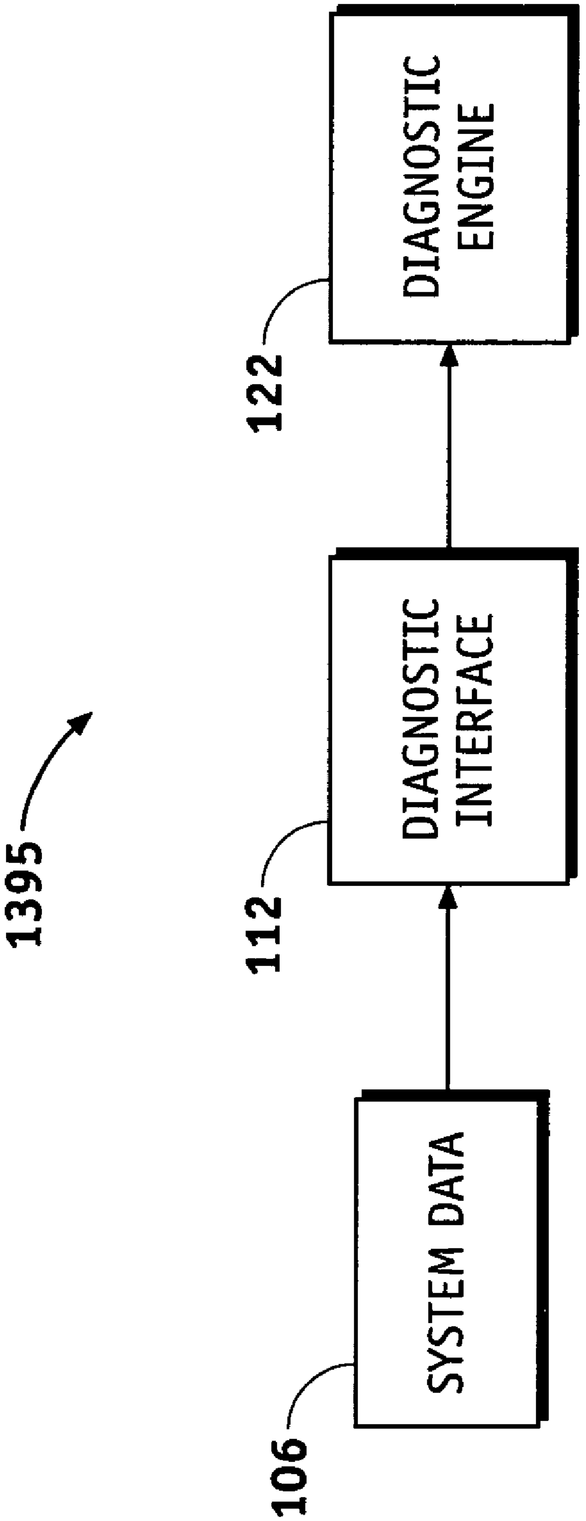
FIG. 1 is a block diagram of an exemplary model-based diagnostic interface.

A diagnostic interface accepts systems data in various forms and manipulates them into a form acceptable as input to a diagnostic engine. Extensive manipulation may be required to produce the acceptable forms, depending on the selected diagnostic engine. A particular diagnostic engine may require trend data, for example. As shown in FIG. 1, a model-based diagnostic interface 112 may be used with any source of system data 106 that is used for system diagnosis using a diagnostic engine 122. System data 106 is data from a system including, without limitation, telemetry, test data, test point data, inputs, intermediate results, and outputs. System data 106 has one or more systems nomenclatures which includes data identifiers, attribute identifiers, and formats. The diagnostic engine 122 is any one of various types of machine-implemented logic that transform data relating to system 102 into diagnostic results. Diagnostic engines 122 typically have their own nomenclature that is incompatible with various nomenclatures such as telemetry, test data, and test point data nomenclatures. The diagnostic interface 112 receives system data 106 and manipulates the data into forms acceptable to diagnostic engine 122.

Figure 2:
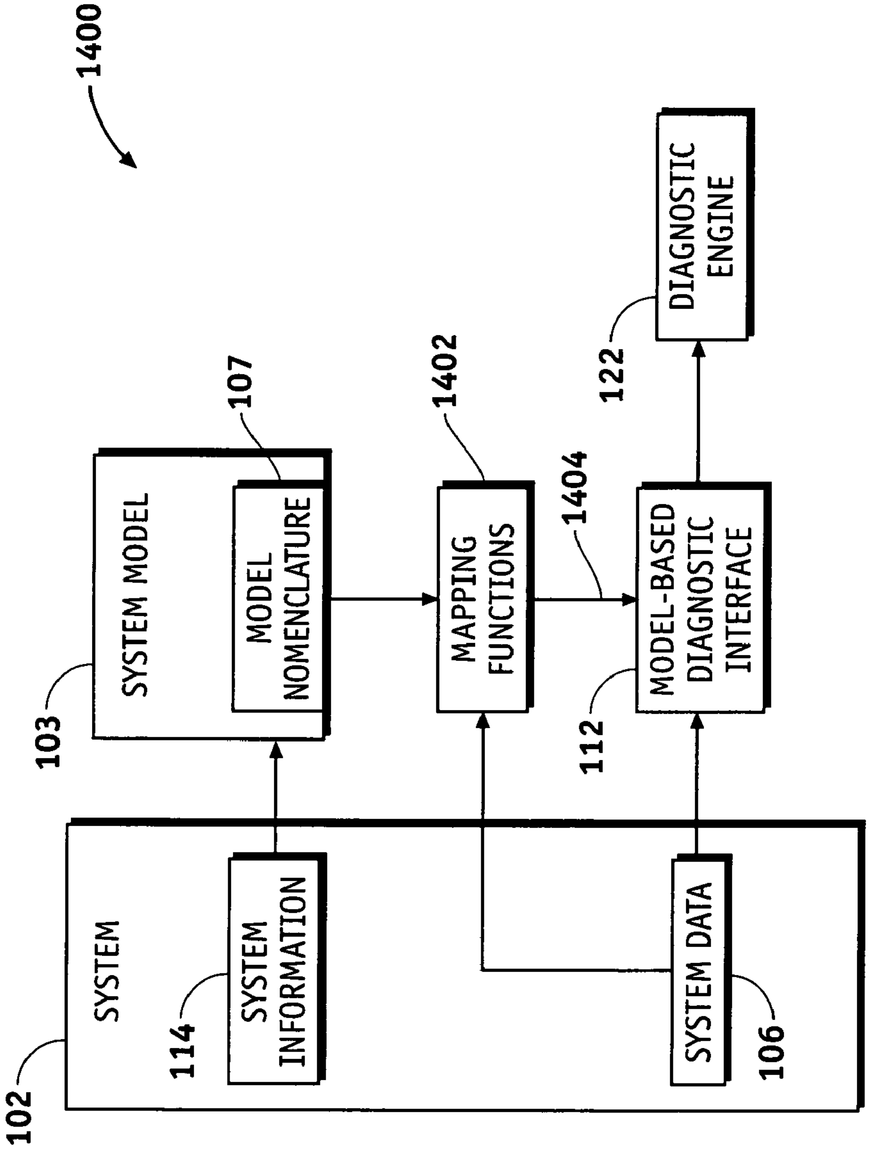
FIG. 2 is a block diagram of the exemplary model-based diagnostic interface of FIG. 1 showing additional details.

FIG. 2 depicts a system 102 which may be envisioned as related components having a defined organization to their relationships. Each component has one or more inputs, one or more outputs, and one or more mechanisms or functions for transforming the inputs into the outputs. In a system 102, an output of one component may be an input to another component. Components may be defined at various levels of detail. For example, an attitude control system may be a component of a spacecraft, a reaction wheel may be a component of the attitude control system, a reaction wheel control electronics module may be a component of the reaction wheel, and a resistor may be a component of the control electronics module. A system 102 has a boundary and that which crosses the boundary is an input to or an output of the system. Some systems 102 are extremely complicated and require other systems just to monitor and mitigate problems in the primary system. An Integrated Vehicle Health Monitoring System (IVHMS) may monitor a more complicated primary system using system data 106 obtained from the primary system 102. The IVHMS may use a diagnostic engine 122 and so require a diagnostic interface 112.

Diagnostic interface 112 may be a model-based diagnostic interface 112. When the diagnostic interface 112 is able to access system data 106 using a model nomenclature 107, the diagnostic interface 112 is said to be model-based. In order to create a model-based diagnostic interface 112, a model nomenclature 107 is defined and the system data 106 is associated with the model nomenclature 107. Modeling nomenclature 107 includes tokens representing aspects of the system. The tokens can be manipulated by modeling software and may include an icon, a variable name, an element (or component) name, a format, a relationship identifier, and the like. To create the model nomenclature 107, we begin with the system 102. The system 102 has, in addition to system data 106, system information 114, which describes the relationships between components in the system 102. System information 114 may be in various forms including, for example, a block diagram or a relational database. System information 114 may include, for example, a system component hierarchy, a network topology, or relationships between data and attributes of data System information 114 may be used, at least implicitly, in building a model 103 of the system 102 by an operator using a model development environment. The model 103 may use simulated inputs to produce the same or simulated outputs as the real system 102. Model 103 has a model nomenclature 107, which includes, without limitation, data identifiers and data attribute names and formats. The model nomenclature 107 is created by the operator who created the model. Accordingly, the model nomenclature 107 is primarily arbitrary and plastic, though it may be bound by certain limitations of the model development environment in which the model 103 is made. The model nomenclature 107 may take various forms including, for example, a list, a relational database, or a table in a relational database. Unlike the one or more systems nomenclatures, the model nomenclature 107 may easily be changed by an operator.

Once the model nomenclature 107 is defined by the creation of the model 103 it remains to associate, or map, the systems data 106 to the model nomenclature 107. Mapping functions 1402 map system data 106 to the model nomenclature 107. The result of using the mapping functions is mapped system data 1404 which is system data 106 accessible by using a model nomenclature 107. An advantage of the model-based diagnostic interface 112 is that proposed changes in the real system 102 may be experimented with in the model 103 before implementation, and the corresponding changes to the diagnostic system 112, 122 may be modeled and developed along with changes to the real system 102. Accordingly, changes to the diagnostic system 112, 122 may not lag changes to the real system 102. Model-based diagnostic interface 112 may access system data 106 values using mapped system data 1404 by referring to the system data 106 by its associated model nomenclature 107 in an executable statement.

The model-based diagnostic interface 112 described above has stand-alone capabilities as an interface between the system data 106 and the diagnostic engine 122. The model-based diagnostic interface 112 becomes a more powerful tool if it is available to other programs, such as IVHMS programs. In order to make the diagnostic interface 112 available to an IVHMS program, the mapped system data 1404 may be bound to additional information relevant to the IVHMS program in executable statements that are available to the IVHMS.

Figure 3:
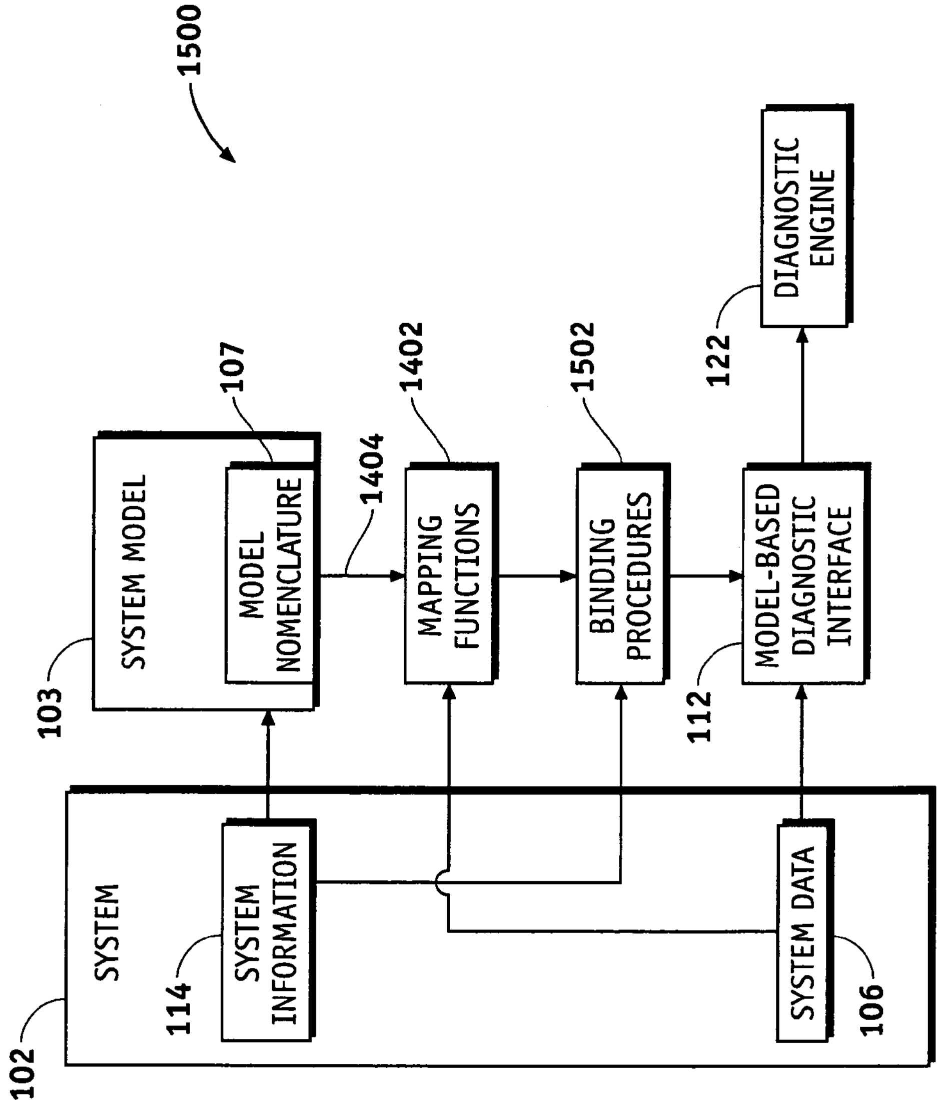
FIG. 3 is a block diagram of the exemplary model-based diagnostic interface of FIG. 1 showing even more details.

Binding procedures 1502, as shown in FIG. 3, bind mapped system data 1404 to system information 114. The result of using the binding functions 1502 is one or more classes from which computational objects may be made. The resulting objects have data access and manipulation capabilities that allow computational access to system data 106 via a model nomenclature 107 whenever the appropriate objects are linked or otherwise employed by reference to the system information therein bound. For a simple example, the IVHMS seeks to monitor the health of a particular thruster, resulting in the IVHMS dynamically linking to an object in the model-based diagnostic interface 112 which includes system information 114 regarding the particular thruster. The linked diagnostic interface object loads to "GET" (C++ verb) ThrusterOneTemp, which is an exemplary model nomenclature 107 name for an item of system data 106 in a particular portion of a particular data frame in a telemetry stream which holds raw data relating to the desired thruster temperature. The linked diagnostic interface object may then further use system information 114, such as the relationship between the raw telemetry data (perhaps a binary bit stream) and degrees Fahrenheit, format the thruster temperature in degrees Fahrenheit in a format acceptable to the diagnostic engine 122, and supply the formatted data to diagnostic engine 122.

Binding system information 114 to the mapped system data 1404 creates an IVHMS context for the diagnostic interface 112. It will be appreciated that programs other than an IVHMS may use information other than system information 114 to create a context. System information 114 is simply the correct information to use for an IVHMS, which can use system data 106 based upon system information 114. The objects binding mapped system data 1404 to system information 114 may compose a dynamically linked library (DLL) or similar construct which may, in a particular embodiment, be the model-based diagnostic interface 112.

Figure 4:
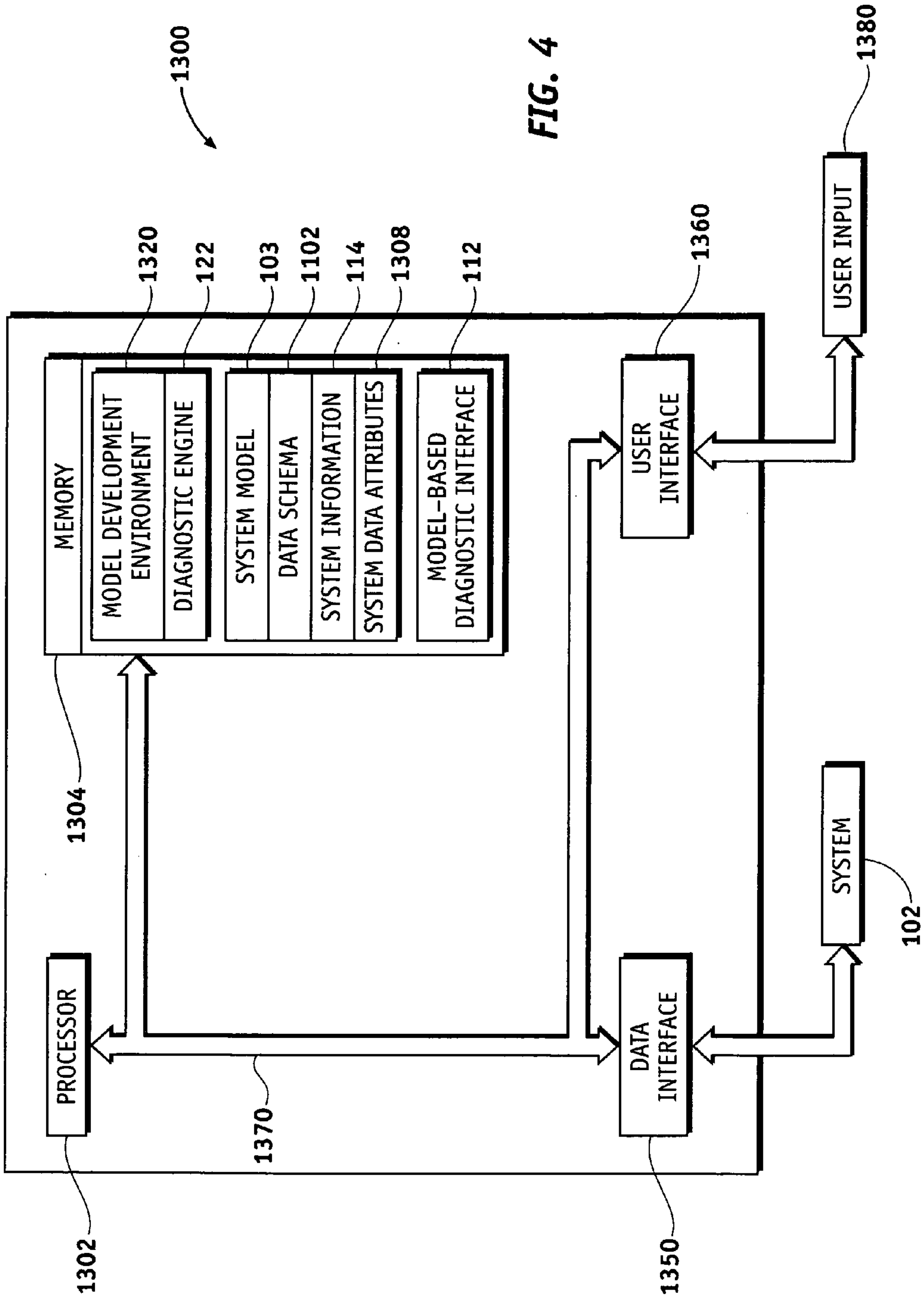
FIG. 4 is a block diagram of an exemplary model-based diagnostics interface associated with an IVHM system.

FIG. 4 shows an exemplary apparatus 1300 for developing a model-based diagnostic interface 112. The apparatus comprises a processor 1302, a memory 1304 coupled to the processor 1302, a data interface 1350 coupled to the processor 1302, and a user interface 1360 coupled to the processor. The couplings are accomplished by bus 1370. The memory is configured to store a systems model development environment 1320 and at least one run-time diagnostic engine 122 coupled to said systems model development environment. Data interface 1350 is coupled to system 102 as a source of system data 106. The model development environment 1320 enables a user supplying input 1380 through the user interface 1360 to create a model 103 of the system. The user may employ system information 114 and system data attributes 1308 in creating the model 103. For example, an operator may reference system information 114 and system data attributes 1308 for operator inputs or may use the data as input to a model development environment 1320 which builds a system model 103 from data files. The system model 103 has a model nomenclature 107.

Figure 14:
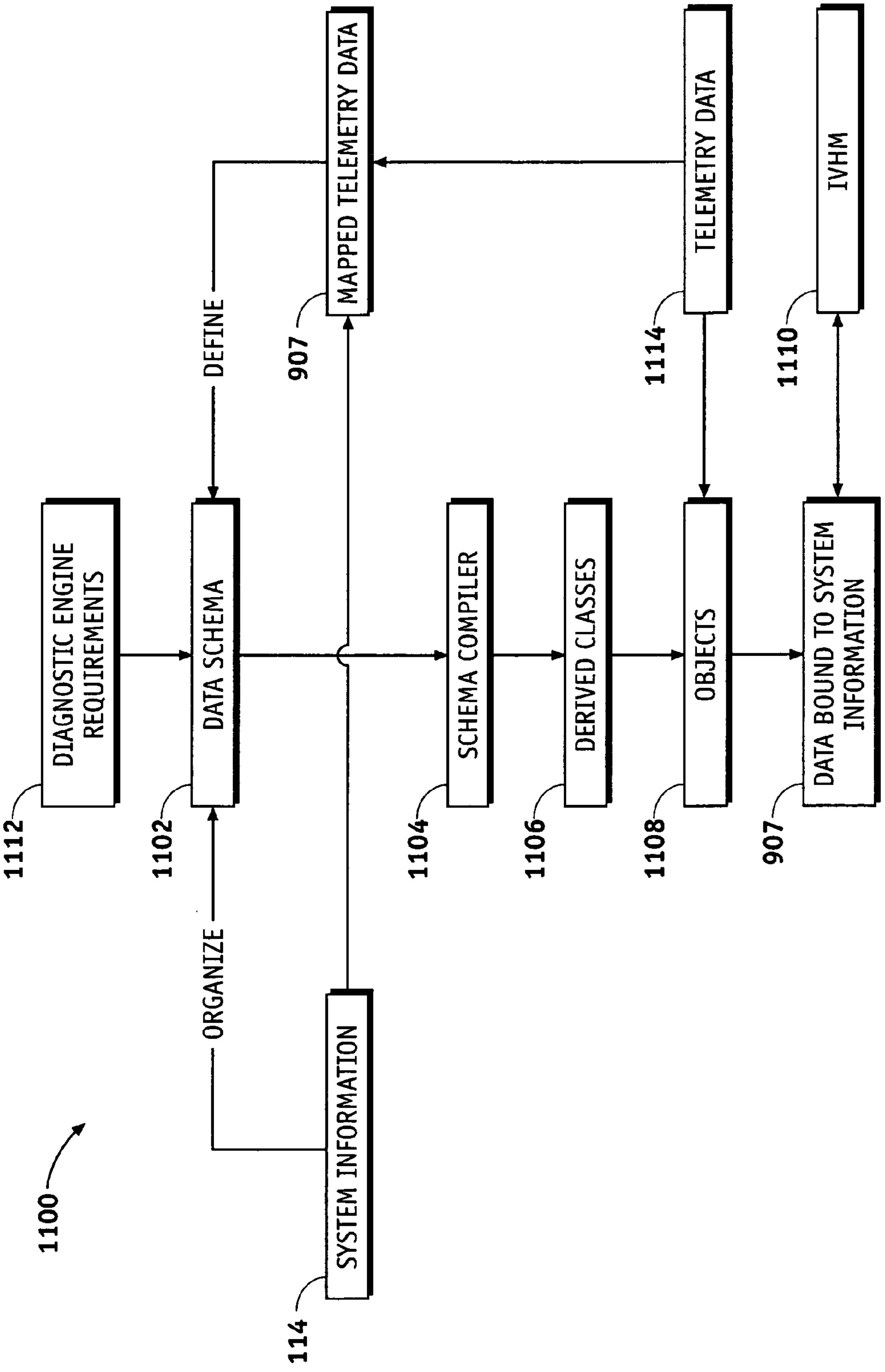
FIG. 14 is a flowchart of an exemplary process step from FIG. 13 of binding mapped data to system information.

Once the system model 103 has been built, then either the model development environment 1320 or a separate program (not shown) maps the system data 106 to the model nomenclature 107 as described in more detail above. The system data 106 may be associated with system data attributes 1308 before mapping The mapped system data has a data schema 1102 which is compiled by a schema compiler 1104, as shown in FIG. 14. The schema compiler 1104 may be incorporated as part of the model development environment 1320. In an alternate embodiment, the schema compiler may be an independent program. Compilation of the schema 1102 by the schema compiler 1104 creates classes for making objects which together may form the model-based diagnostic interface 112, shown stored in memory 1304.

The model development environment 1320 and the one or more diagnostic engines 122 may be coupled by the creation of functions for inclusion in the classes or objects, where the functions transform the bound system data into inputs for the diagnostic engines 122. It will be understood by those of skill in the art that there are various ways in which the model development environment 1320 may gain access to information regarding the input requirements of the diagnostic engines 122 and that all of these various ways are contemplated within the coupling of the diagnostic engines 122 to the model development environment 1320. Once access to the information regarding the required inputs to the diagnostic engine has been obtained and the system data 106 is known, functions may be generated for transforming the bound mapped system data into inputs for diagnostic engines 122. Various conventional compilation and linking strategies may be used to compile the functions with the bound mapped system data. The objects may be collected in a DLL accessible to an IVHM. In a particular embodiment for employing a plurality of diagnostic engines, each object has access to information relating to which diagnostic engines 122 are selected and each object may contain functions for providing appropriate inputs to each selected diagnostic engine 122. In another particular embodiment, the binding procedures 1502, as shown in FIG. 3, have access to diagnostic engine selections, and a separate DLL, or software library equivalent, is created for each diagnostic engine with the sum of the DLLs composing the diagnostic interface 112.

The DLL or other library or program construct containing the model-based diagnostic interface may be distributed as a program product on any signal media, including storage and transmission media Distribution may be as part of an IVHM or as the diagnostic interface 112 alone.

Figure 5:
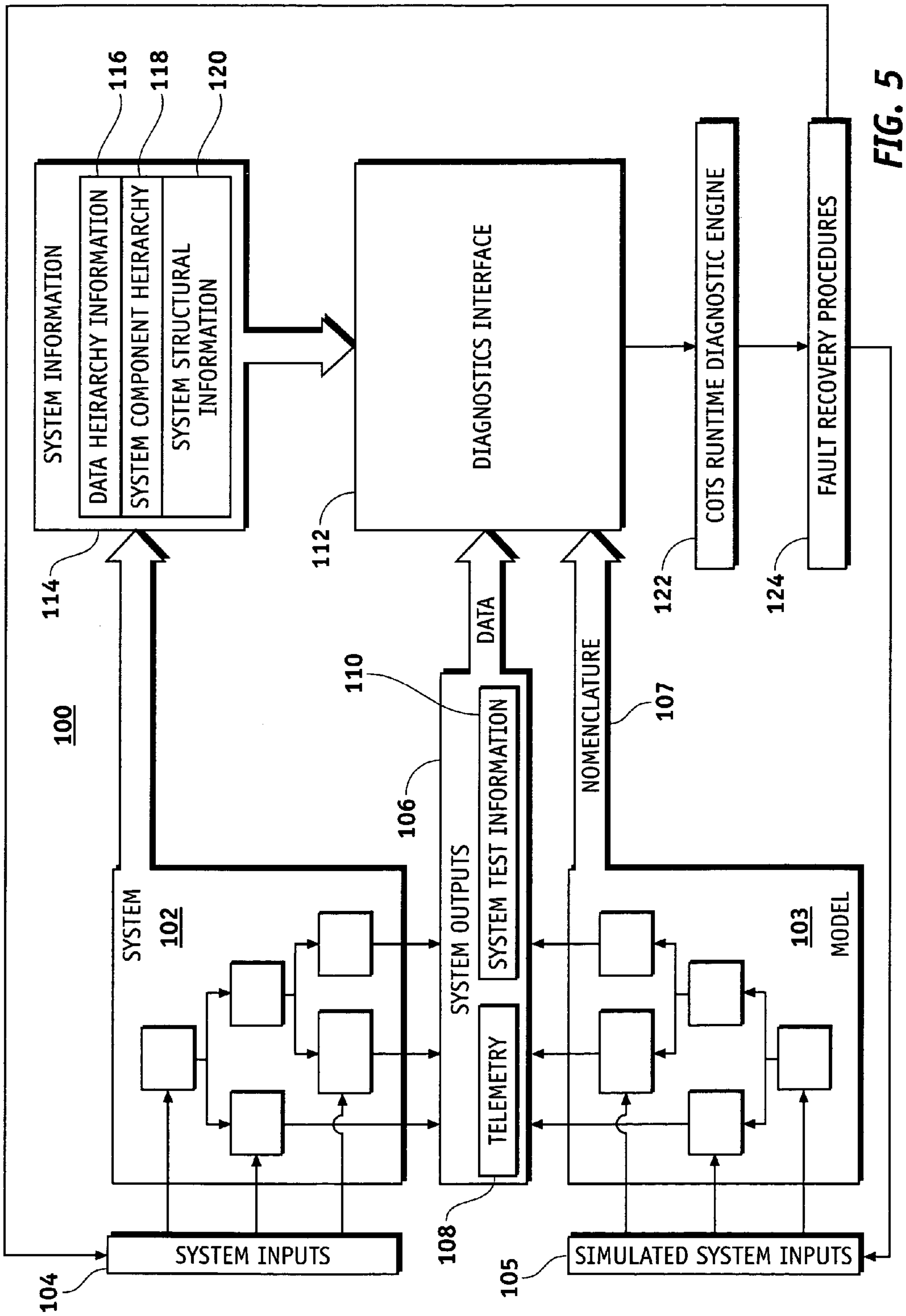
FIG. 5 is a flowchart of an exemplary method for creating a run-time model-based diagnostics interface.

Systems have a physical structure and an information, communications, or data structure. FIG. 5 shows the information structure 100 of an UVHMS using an exemplary model-based diagnostics interface 112. The information structure 100 includes a system 102 and its representation in a model 103 having system inputs 104 and simulated system inputs 105, respectively, and system outputs 106. System inputs 104 may be data, forces, environmental influences, commands, switch state changes, or any other factor that can affect the state of the system 102. Simulated system inputs 105 may be data files, functions, objects, or other data structures containing or producing data that simulate what the system 102 senses of the outside world at a system boundary. System outputs 106, or system data 106, include at least telemetry 108 and should include system test information 110. System test information may also include test point information. Inherent in the system 102 is system information 114 which includes information about relationships internal to the system 102. For example, data hierarchy information 116, system component information 118, and system structural information 120, such as component hierarchy 120 may be included in system information. The system outputs 106, model 103 nomenclature 107, and the system information 114 are used to create the model-based diagnostic interface 112 (as will be further discussed below). System outputs 106 are inputs to the model-based diagnostic interface 112. The model 103, which has a nomenclature 107, provides that nomenclature 107 to the model-based diagnostic interface 112, as will be seen in more detail below. The outputs of the model-based diagnostic interface 112 are inputs to at least one commercial-off-the-shelf (COTS) runtime diagnostic engine 122, which produces diagnostic outputs used by fault recovery procedures 124 to change system inputs 104 or 105 to respond to the diagnosed condition.

Figure 6:
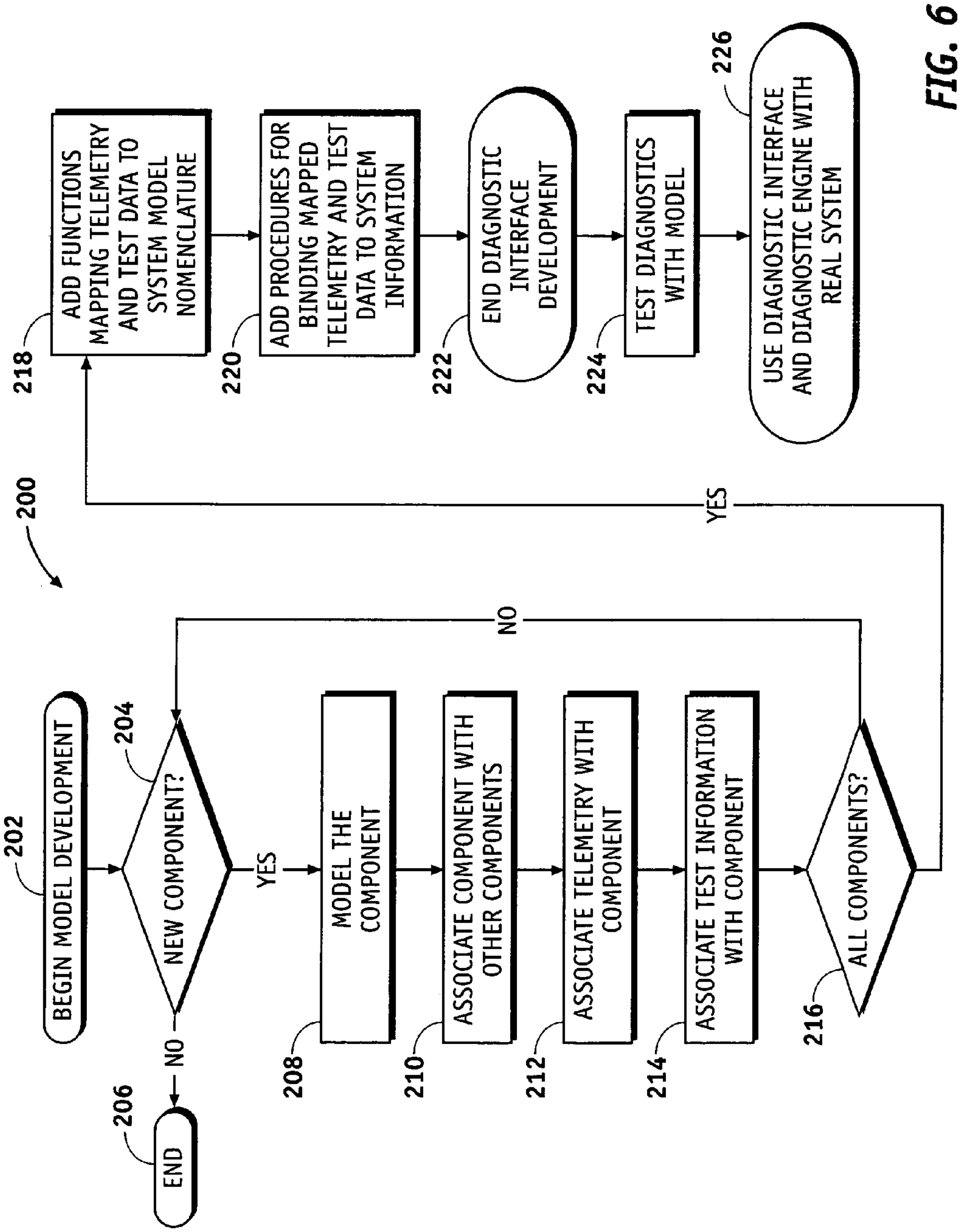
FIG. 6 is a block diagram of an aspect of an exemplary diagnostic interface.

FIG. 6 shows a flowchart of an exemplary process 200 for creating a model-based diagnostic interface 112. The process 200 begins in step 202 with model development which may be accomplished using one of various COTS system modeling development tools and environments familiar to those of ordinary skill in the art of system modeling or may be an in-house or customized modeling development tool serving a similar purpose. Step 204 determines if a new component is to be modeled and, if not, may end process 200 in step 206. It will be appreciated that other activities may take place in a system modeling development environment, but they are not immediately relevant here. For example, running the system model 103 with a set of inputs 105 to observe system behavior or editing a model 103 may be accomplished between steps 204 and 206.

Figure 9:
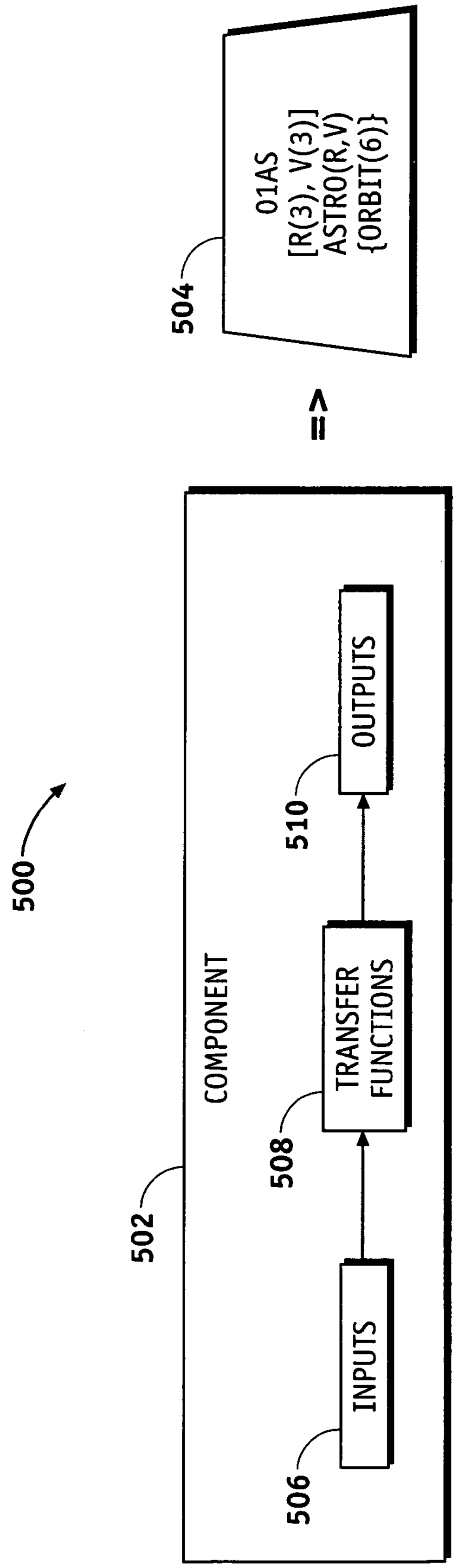
FIG. 9 is a block diagram of an exemplary modeled component and its exemplary equivalent modeling icon in a first step of creating an exemplary model-based diagnostics interface.

If step 204 determines that a new component is to be modeled, step 208 provides a basic model of the component. A component may be created in the modeling development environment by an operator, but computer-generated systems models may be used if data is available in a form tractable to the model development environment. An exemplary equivalence relationship 500 between a block diagram of an exemplary component 502 and its equivalent (denoted by "=>") exemplary icon 504 in a system modeling environment is illustrated in FIG. 9. The component 502 includes inputs 506, one or more transfer functions 508, and outputs 510. The transfer functions 508 produce outputs 510 in response to inputs 506. The transfer function may model an electronic circuit, an electromechanical, mechanical, electrical, fluidic, or similar device, digital logic, analog logic, or any other device or combination of devices of any type which transforms inputs 506 into outputs 510. Exemplary icon 504 contains a component identifier "01AS", information about the inputs 506 "[R(3), V(3)]", information about the transfer function "ASTRO(R,V)" and information about the outputs 510 "{ORBIT(6)}." It will be understood that, despite the simplicity of the example, inputs 506, transfer functions 508, and outputs 510 may be of any complexity tractable by a computer. The example of a component "01AS" that transforms three-dimensional Cartesian position "R(3)" and velocity "V(3)" vectors into classical orbital elements "{ORBIT(6)}" is not intended to be limiting. Component 502 may be a component in any sort of system modeled in step 208. For example, components for communications networks, space vehicles, ships, nuclear power plants, power grids, or other systems may be modeled in step 208. Likewise, various icons and various schemes of identification of required inputs 506, transfer functions 508, and outputs 510 may be used without departing from the present invention. The icon 504 together with its associations with other icons (as described below), component identifier, and additional textual data within the icon are an expression of the component in a model nomenclature. The block diagram of the component 502 is an expression of the component in a systems nomenclature. Systems 102 of components may likewise be expressed in systems nomenclature and model nomenclature.

Figure 10:
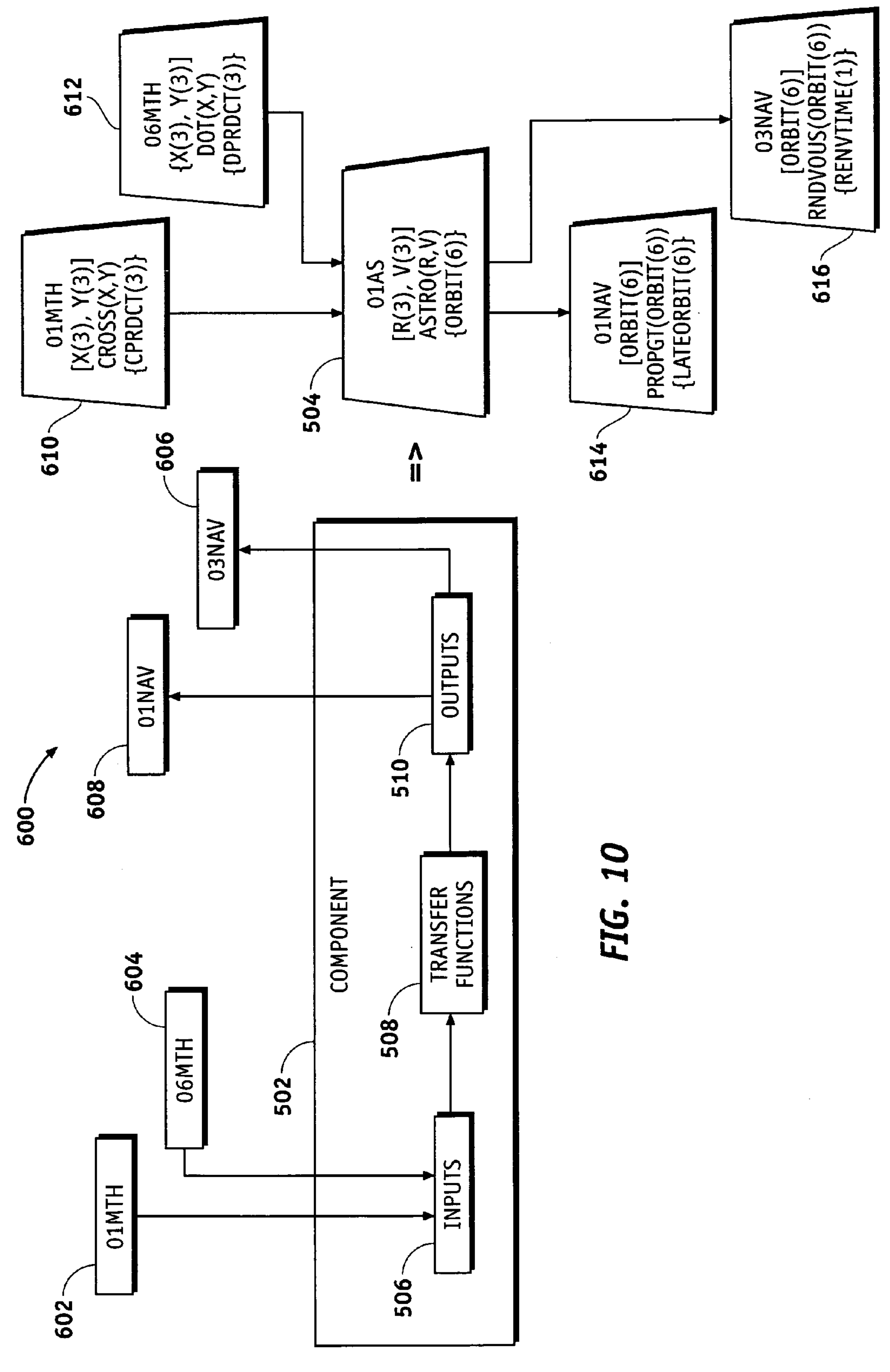
FIG. 10 is a block diagram of the exemplary modeled component of FIG. 9 with exemplary data inputs and data outputs and the exemplary equivalent modeling icons therefore.

Once a new component 502 of a system to be modeled has been created in step 208, the new component 502 may be associated with other components in the system being modeled in step 210. A new component 502 associated with other components 602, 604, 606, and 608 is shown in exemplary equivalence relationship 600 in FIG. 10. Exemplary components 602 and 604 are shown as components which supply inputs 506 to component 502. Exemplary components 606 and 608 are depicted as consumers of outputs 510. Icons 610 and 612 for input suppliers 602 and 604 and icons 614 and 616 for output consumers 606 and 608 may have a similar form to icon 504. Typically, icons are drawn to a convention or standard throughout a systems model. Within a convention, components may be of different classes which may have different icons with appropriately adapted information displayed thereon. While only two input suppliers 602 and 604, and only two output consumers 606 and 608 are shown in FIG. 10, it will be appreciated that any number of other components of any type and iconic design may be associated in step 210. It will be appreciated that not all system modeling environments use icons, and that non-iconic expressions of a systems model may have a model nomenclature without reference to icons.

Figure 11:
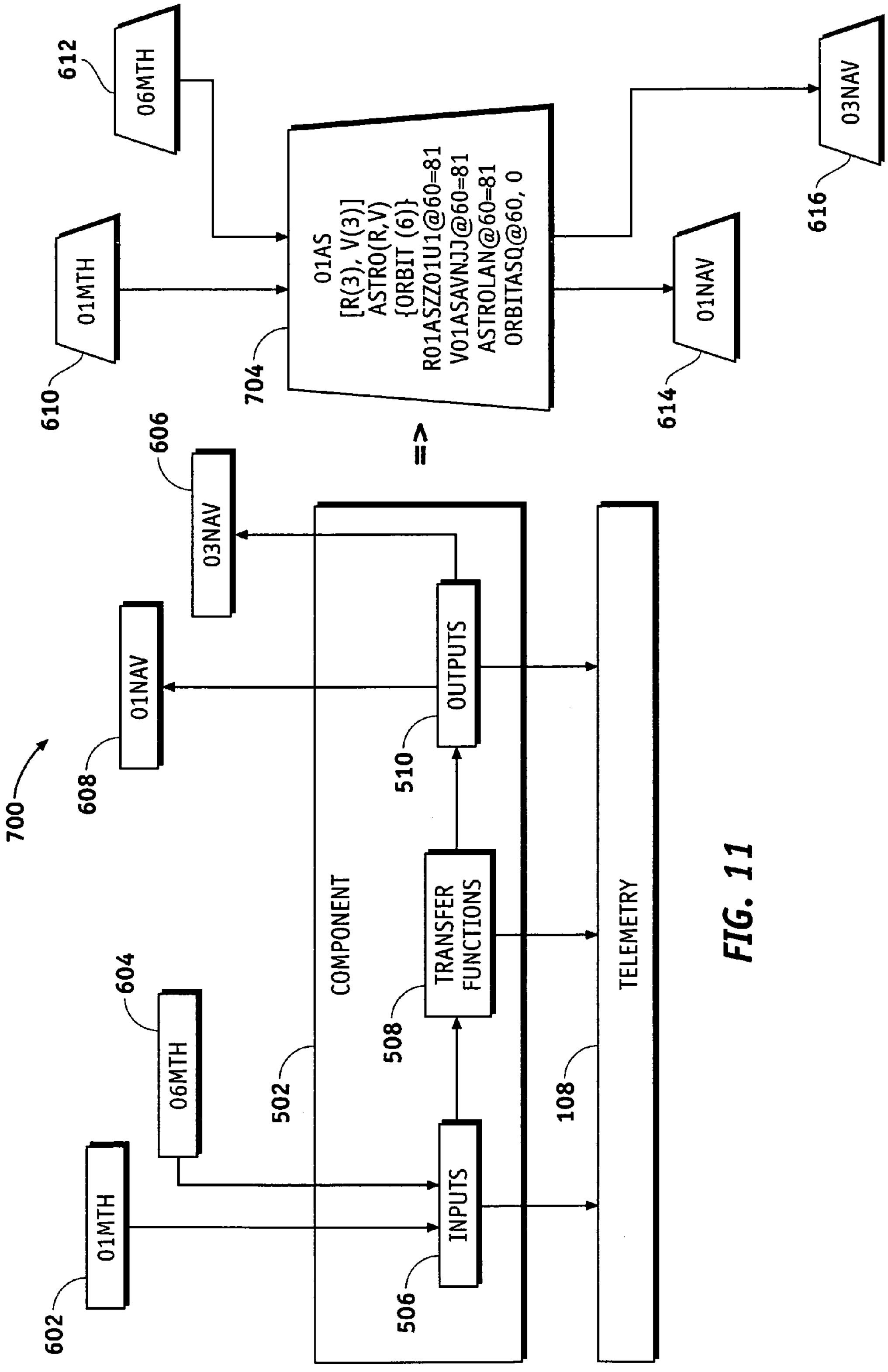
FIG. 11 is a block diagram of the exemplary modeled component of FIG. 10 with an exemplary telemetry output and the exemplary equivalent modeling icons therefore.

In step 212, telemetry 108 is associated with the component 504 as shown in exemplary equivalence relationship 700 in FIG. 11. Telemetry 108 comprises data indicating the status of component 502 and may include one or more of the inputs 506, results, intermediate results, or internal values of transfer functions 508, and outputs 510. The telemetry 108 of the model 102 should duplicate the telemetry 108 from the actual system 102, or from observed behavior of the actual system, wherein the telemetry captures the results of these observations. In an alternate embodiment, modeled telemetry 108 may be a subset of actual telemetry 108. Accordingly, the transfer functions 508 may produce a portion of telemetry 108 as intermediate results of the transfer functions 508. Icon 704 shows the addition of telemetry data names (e.g., "R01ASZZ01U1", "V01ASAVNJJ", etc.) along with data rate information "@60" and telemetry data format information "=81". In an embodiment, the telemetry data names, or other system data names, may be parsed to reveal details of the point of origin of the data within the component 502. The telemetry data and information relating to telemetry data together define a telemetry nomenclature. Association of telemetry 108 to component 502 may be accomplished one component at a time. In an alternate embodiment, a database which relates telemetry 108 data to component identifiers may be an input to the model development environment which may make associations between a plurality of components and their telemetry 108 information, or telemetry attributes, in a single step.

Figure 12:
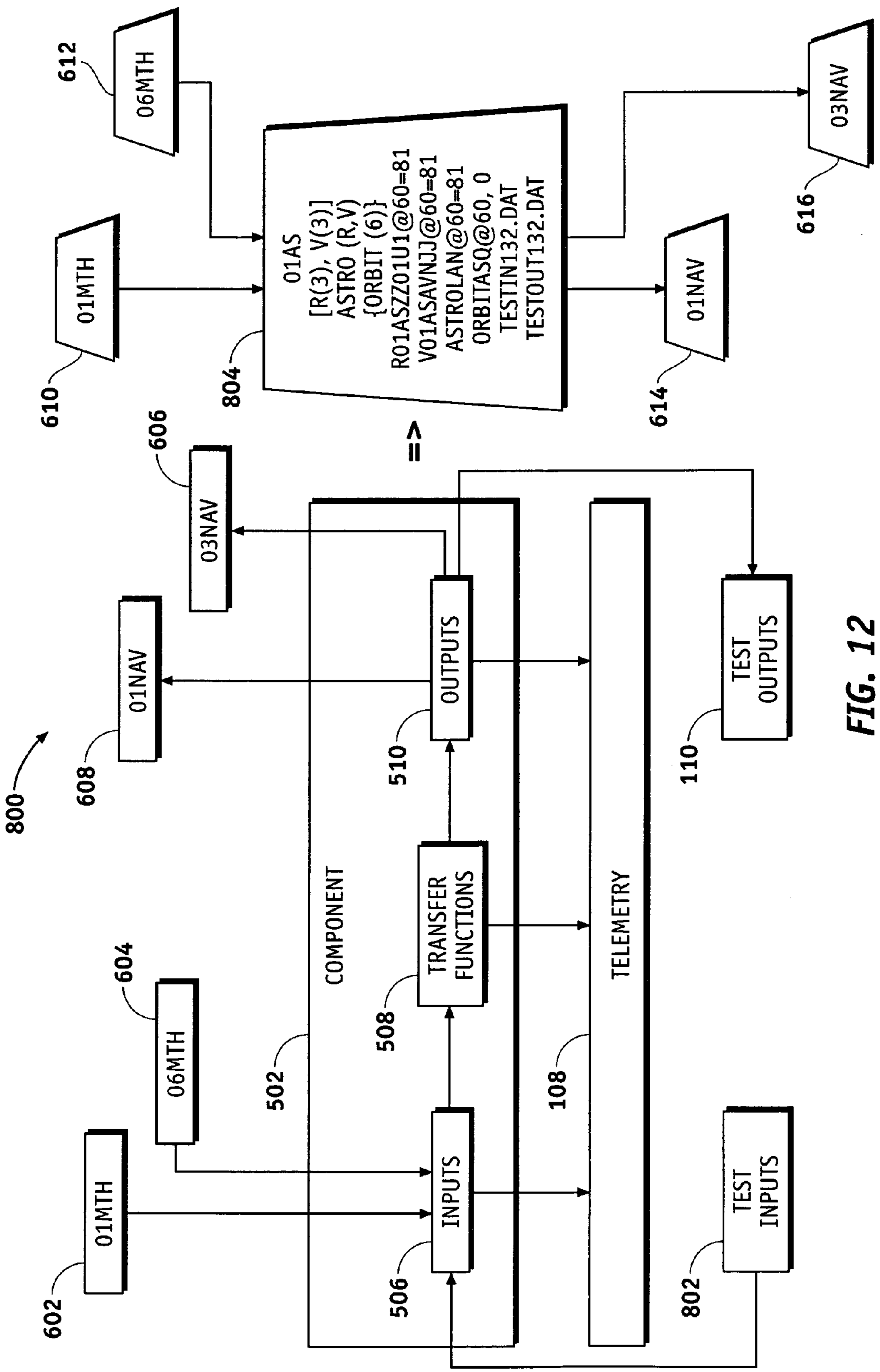
FIG. 12 is a block diagram of the exemplary modeled component of FIG. 11 with exemplary test inputs and test outputs and the exemplary equivalent modeling icons therefore.

The component 502 may also have test information 110 associated with it in step 214 as further shown in exemplary equivalence relationship 800 in FIG. 12. Tests may include built-in tests, boundary scan tests, acceptance tests, aggregated systems comparison tests, complex function tests, or the like. The tests may have test inputs 802 which elicit responses from the component 502 in the form of test outputs 110. Test outputs 110 may be similar in format to telemetry data 108 or may have a format uniquely adapted for the particular test. The test output data 110 and its format and related information together define a test data nomenclature.

Once a component 502 has been modeled (step 208), associated with other components (step 210), associated with telemetry (step 212) and with test information (step 214), step 216 determines if all components have been added to the system model 103. If step 216 determines that more components remain to be modeled, step 204 leads to step 208 to begin modeling the next component. If all components, or a desired predetermined number of components which enable at least some diagnostic functions have been modeled, then step 218 adds functions mapping telemetry 108 and test data 110 to the model nomenclature as illustrated in step 218. The steps leading up to step 218 translated a system 102 described in a systems nomenclature into a systems model 103 described in a model nomenclature 107.

Step 218 adds functions for mapping telemetry and test data to the model nomenclature 107. The functions associate each telemetry data element from system 102 with each respective equivalent thereof in the model 103. Telemetry data 108 may be identified in the real system 102 as the contents of a portion of a data frame at a particular time offset from a frame synchronization signal. The position of the telemetry item in the telemetry data stream may be associated with a telemetry identifier which provides access to the position information. For example, the third sub-frame of a second data frame in a sequence of telemetry data frames may contain the first component of the position vector once every second in a real number data format, and that may be mapped to model nomenclature "R01ASZZ01U1@60=81 in icon 01AS supplied by components 01MTH (602) and 06MTH (604) and supplying components 01NAV (614) and 03NAV (616)." It will be understood that the model nomenclature 107 is depicted in simplified form for purposes of illustration, and that the model nomenclature for a telemetry data item may include substantially more information. For example, a telemetry item may be additionally mapped to an entire modeled data communication hierarchy through which the telemetry data flows to the boundary of the system and an entire modeled system hierarchy that goes into producing the telemetry data item. Functions added in step 218 will vary in complexity adapted to the particular system under consideration and the diagnostics ultimately desired. The result of the mapping is shown in the exemplary equivalence diagram 900 in FIG. 13 as mapped telemetry data 905 which has a defined data organization, or schema, and associates telemetry data items in a live, simulated, or replayed telemetry stream with respective corresponding telemetry attributes expressed in the model nomenclature 107.

Figure 13:
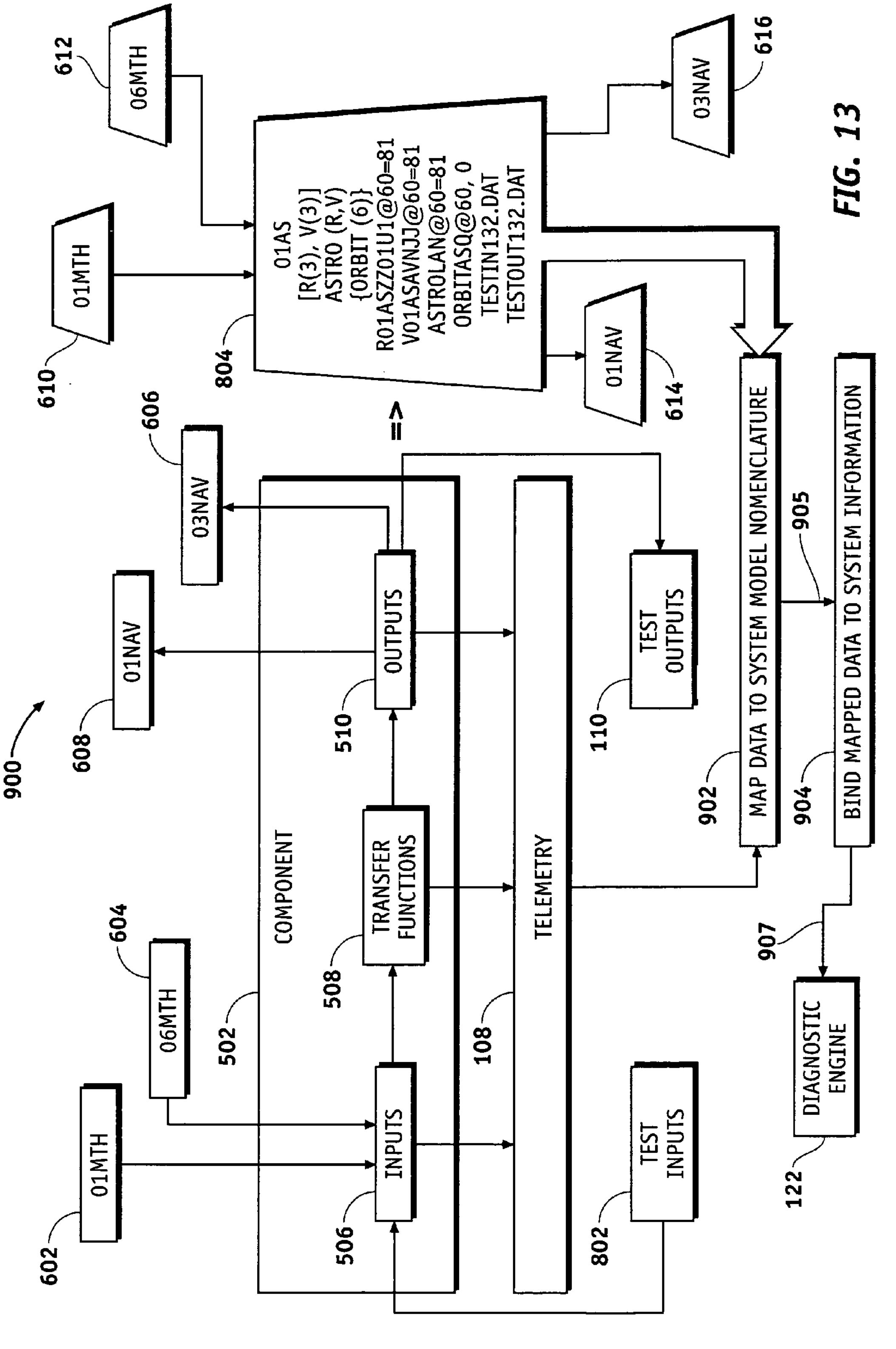
FIG. 13 is a block diagram of the exemplary modeled component of FIG. 12 and the exemplary equivalent modeling icons therefore, presented as exemplary inputs to a system diagnostic process.

Step 220 adds procedures for binding the mapped telemetry data 905 to system information 904 as depicted in FIG. 13. It will be understood that data is bound when it is incorporated into a computational object at creation. A computational object in a dynamic linked library (DLL) or equivalent software library may be linked during the running of an IVHMS or similar computer program and may bind data at that time. Referring to FIG. 14, one approach to data binding is depicted. Other methods of data binding known in the art may be used. An object that binds data is an object 1108 of a derived class 1106 created by compiling a data schema 1102 with a schema compiler 1104. The data schema 1102 may be created based upon the mapped telemetry data 907, system information 114, and the input requirements 1112 of one or more COTS, or internally developed diagnostic engines 122. For example, an IVHM software program 1110 may link to objects 1108 to access a telemetry stream and/or test data stream which has been mapped to system information 114 in order to produce inputs 907 to the one or more COTS diagnostic engines 122. The data schema 1102 may be organized based upon system information 114 and defined, or formatted, based on the mapped telemetry data 907 and its attributes. For example, the data schema 1102 may be organized by system component with each data element to be bound defined by a telemetry identifier and a format. The objects 1108 linked to the IVHM 1110 use model nomenclature 107 to "GET" (as in the C++ verb) telemetry data 1114 during run time, manipulate it according to functions in those objects 1108, and provide data bound to system information to the COTS diagnostic engines 122.

Construction of the model-based diagnostic interface 112 ends in step 222. Testing of the model-based diagnostic interface is desirable and takes place in step 224. An advantage of the exemplary embodiment of the model-based diagnostic interface is that, once the IVHM is compiled with the objects 1108, the data source becomes irrelevant to the IVHM. The data source may be live telemetry, simulated telemetry, or replayed telemetry or similarly varied test data. Accordingly, the IVHM can be built (step 222) and tested (step 224) using the systems model 103 in a simulation and then embedded in or otherwise coupled to the real system 102 to perform real-time diagnostics as in step 226.

Referring again to FIG. 5, the output of the COTS diagnostic engine 122 may produce responses from a computer program capable of executing fault recovery procedures 124 in the system 102. Such procedures may change the state of a cross-strapping switch in system 102 or the model 103, for example. Accordingly, the model-based diagnostic interface 112 enables changing a system 102 state, which can include a physical as well as a logical state of the system 102. The output of the fault recovery procedures 124 may also be input into the simulated model inputs 105 for test and verification.

Figure 7:
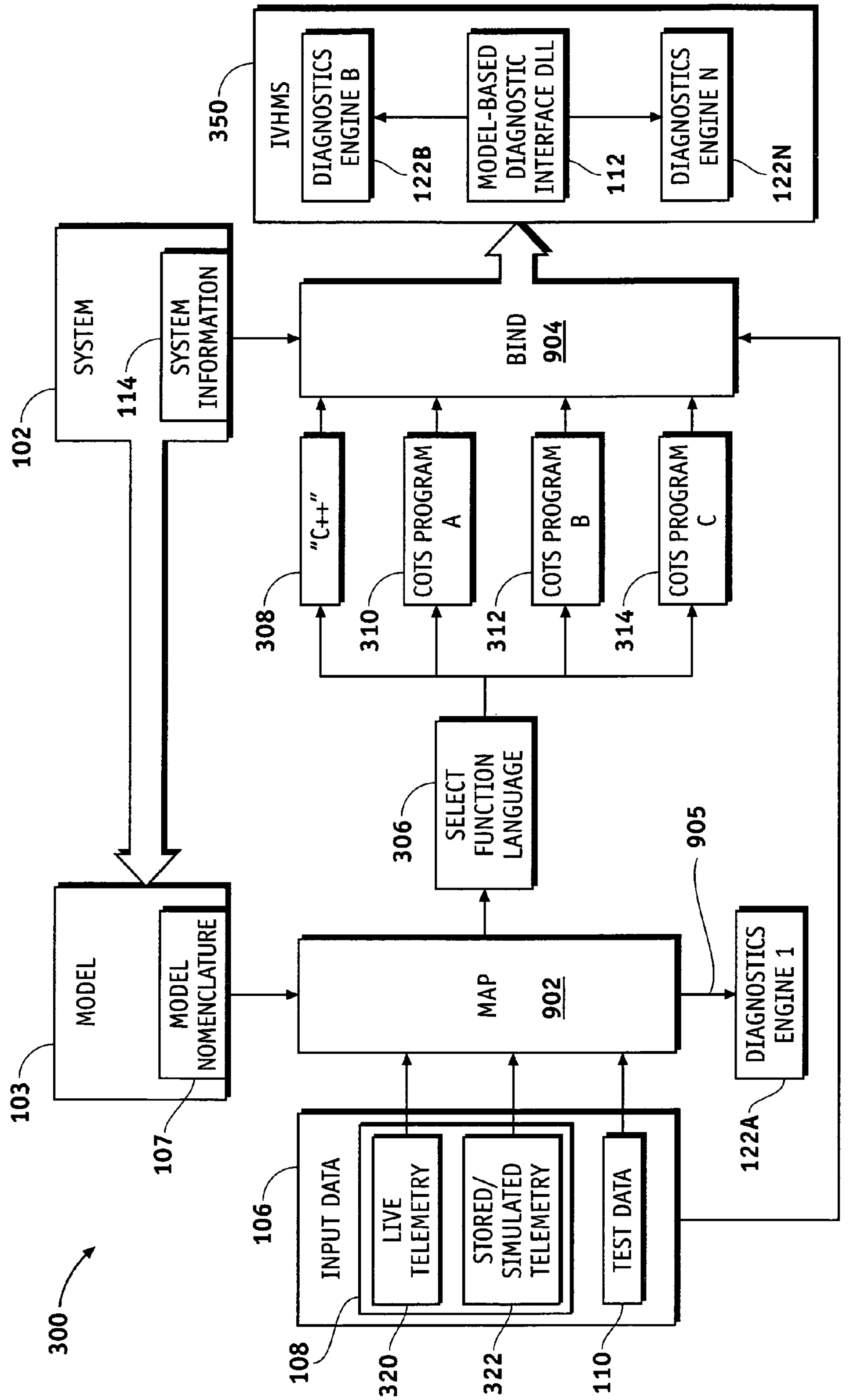
FIG. 7 is a block diagram of an exemplary apparatus for making a model-based diagnostic interface.

FIG. 7 depicts exemplary embodiment 300 of a method for making a diagnostic interface 122 showing alternate sources of binding procedures 308, 310, 312, and 314. An advantage of the exemplary embodiment 300 is that a variety of COTS computer programs which support objects, such as the well known Mathematica, C++(308), MATLAB, and the like may be used for creating the objects to which the mapped telemetry is bound. This permits creation of procedure libraries and thereby reduces the cost of creating the model-based diagnostic interface 112. The objects produced include functions that are adapted for the particular schema of the mapped data 905, the system information 114, and the needs of the diagnostic engine 122B-122N. Input data 106, including live telemetry 320, stored telemetry 322, or simulated telemetry (not shown) as well as test data 110, is mapped to systems nomenclature 107 in step 902. In an alternate embodiment, a particular diagnostic engine 122A may not require binding but may be able to operate on mapped telemetry data 905 alone. For example, legacy diagnostic engine 122A which is not object-based may be supplied with mapped telemetry data 905 directly. For diagnostic engines 122B-122N which use bound data 907, procedures for binding are selected from the procedure libraries and the data is bound to systems information in step 904. A typical binding procedure produces a class for making objects that transform mapped data with attributes into a form receivable by the COTS diagnostic engines 122B-122N. Functions may be mathematical, textual, logical, or a hybrid thereof.

Figure 8:
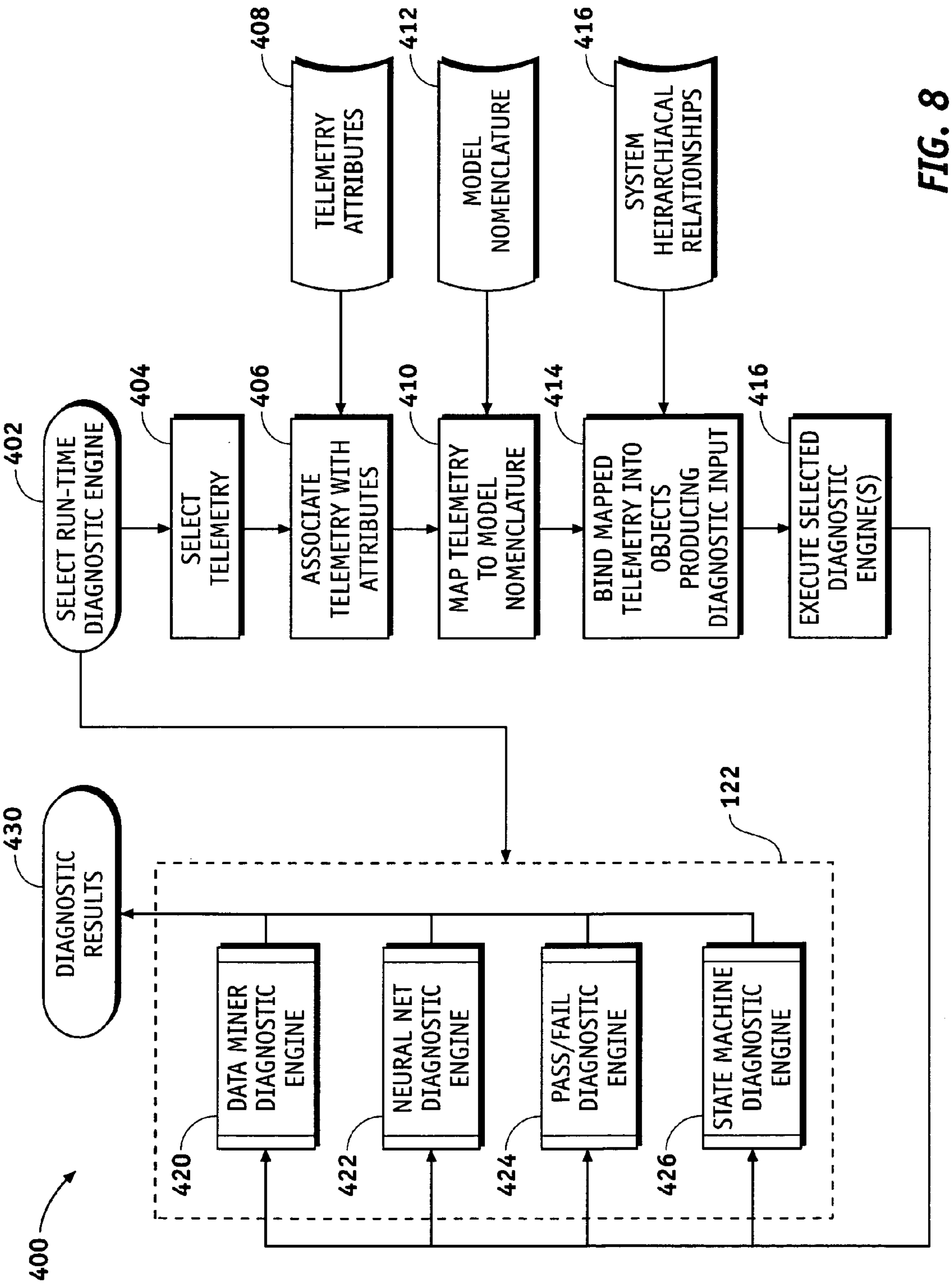
FIG. 8 is flowchart of another aspect of an exemplary method for creating a run-time model-based diagnostics interface.

FIG. 8 depicts the exemplary embodiment 400 of the method of obtaining diagnostic results 430 using a model-based diagnostics interface 112 which more particularly depicts the selection of a diagnostic engine 420, 422, 424, 426. In this aspect of the exemplary embodiment, one or more diagnostic engines 420, 422, 424, and 426 are selected from a pool of diagnostic engines 122 in step 402 before the model-based diagnostic interface 112 is created. Because diagnostic engines vary in their input requirements, telemetry may be selected in step 404 which is limited to only the telemetry required for the diagnostic engines selected in step 402. The telemetry 108 may be associated in step 406 with telemetry attributes 408. For example, each telemetry data element may be associated with units, type, origin, path, latency, and similar attributes. The telemetry 108 is then mapped in step 410 to a model nomenclature 412 as described above. The mapped telemetry is then bound to objects linkable to an IVHMS which provide inputs to the one or more diagnostic engines 420, 422, 424, and 426 selected from a pool of diagnostic engines 122 in step 402. Step 416 executes the IVHMS, including the selected diagnostic engines 420, 422, 424, and/or 426 and the objects binding the mapped telemetry data with attributes. The selected diagnostic engines 420, 422, 424, and/or 426 produce diagnostic results 430, which may be used by the IVHMS for various purposes. For example, diagnostic results 430 may be used as inputs to fault recovery procedures 124, for prognostic applications, used directly for diagnosis, or for like purposes.

Figure 15:
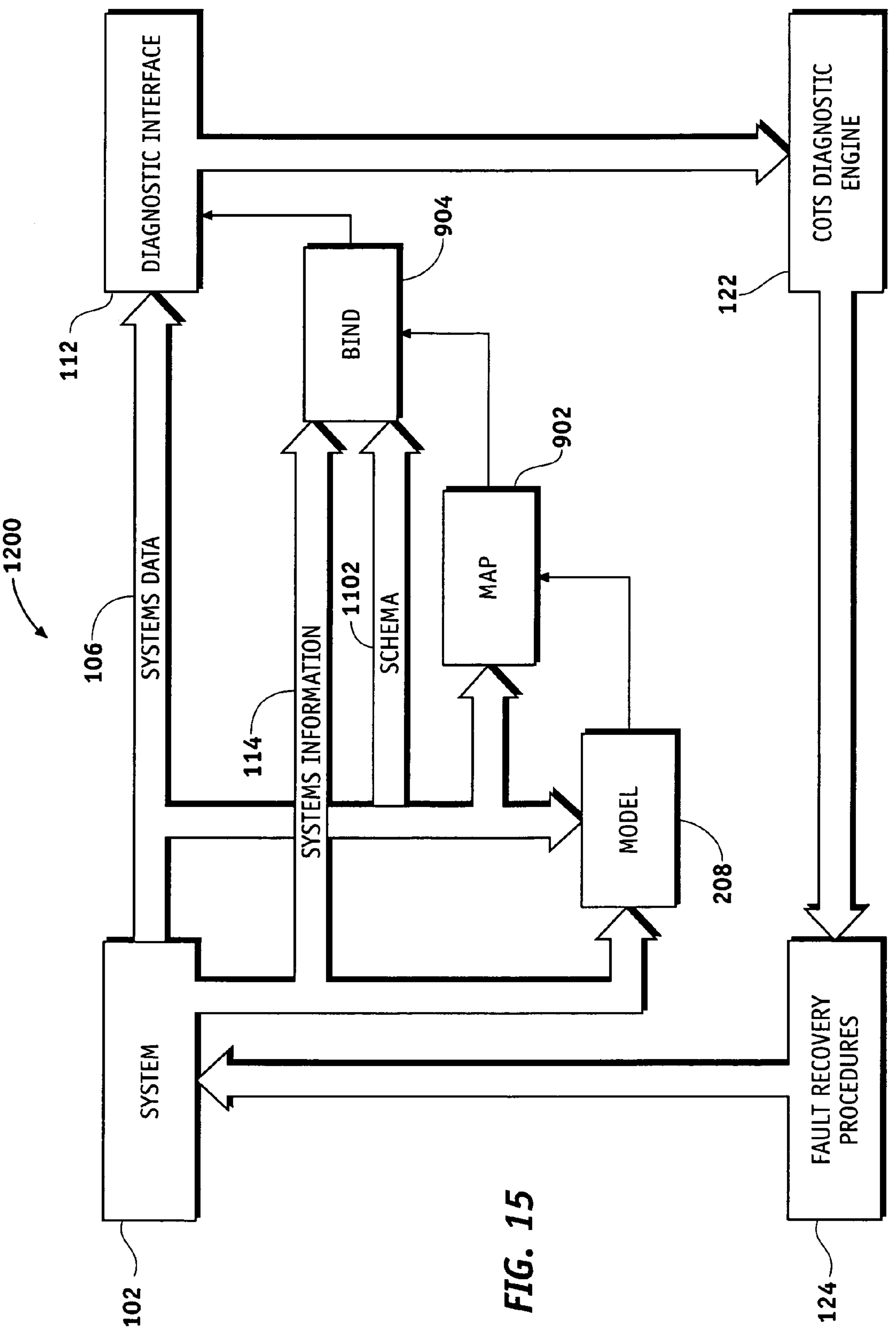
FIG. 15 hybrid flow chart showing the relationships between the steps of making and the steps of using the exemplary model-based diagnostic interface with data from a system.

FIG. 15 is a hybrid block diagram of a simple exemplary IVHMS 1200 and a flow chart showing an exemplary method of creating a diagnostic interface 112. The exemplary steps of creating include, modeling 208, mapping 902, and binding 904. The exemplary IVHMS includes the system 102, the diagnostic interface 112, COTS diagnostic engine 122, and fault recovery procedures 124. In the exemplary IVHMS, model-based diagnostics interface 112 receives systems data 106 from the system 102 and sends diagnostic inputs to diagnostic engine 122 which uses the COTS diagnostic engine 122 to produce diagnostic outputs as inputs to the fault recovery procedures 124, which provide fault recovery inputs to the system 102. The system 102 produces system information 114 which may be used in building the model 103 and at least some of which is bound to mapped system data in step 904. System 102 also produces data 106 which may be the input to the model-based diagnostic interface 112, which is used as a pattern in building the model 103, and which is mapped to the model nomenclature in step 902. The schema of system data 108, 110 is used to create classes which bind mapped system data to system information 114.

While at least one exemplary embodiment has been presented in the foregoing detailed description, it should be appreciated that a vast number of variations exist. It will be appreciated that all that has been presented regarding diagnostic interfaces 112 applies appropriately to prognostic interfaces as well. Furthermore, it will be understood that an advantage of the inventive methods and apparatuses is that a fixed, predetermined, data nomenclature may be adapted to a different fixed, predetermined diagnostic interface 112 data nomenclature through a flexible intermediate model nomenclature 107, thereby giving the operator the flexibility to easily change the diagnostics with changes to the system 102. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for evaluating one or more failures of a system having system information representing relationships within said system and system data representing the status of said system, the method comprising the steps of:

modeling a hierarchical system to include a model nomenclature representation of the system information, model information and nomenclature, system failure mode information and nomenclature, and telemetry information and nomenclature, using the system data;

mapping the system information, the model information and nomenclature, the system failure mode information and nomenclature, and the telemetry information and nomenclature into a binding function, using the model nomenclature representation;

binding the system information, the model information and nomenclature, the system failure mode information and nomenclature, and the telemetry information and nomenclature using the binding function, thereby generating a bound system;

generating an optimized model-based diagnostic interface for runtime execution, using the bound system;

determining one or more system failures, using the bound system and the optimized model-based diagnostic interface; and determining a root cause of one or more of the systems failures, using the bound system and the optimized model-based diagnostic interface.

2. The method of claim 1, further comprising the steps of:

generating computational classes adapted for creating computational objects adapted for producing input data for at least one diagnostic engine from said system data;

selecting at least one pass/fail diagnostic engine from a plurality of diagnostic engines to receive inputs from said computational objects; and selecting a subset of said system data based upon said selection of said at least one diagnostic engine.

3. The method of claim 1 wherein said system data has attributes, and the method further comprises the steps of:

associating said system data with one or more said attributes; and associating at least one item of said system data with at least one respective corresponding element of said model nomenclature.

4. The method of claim 1, further comprising the steps of:

selecting a computational language; and generating functions in said computational language which are executable to generate inputs for at least one diagnostic engine based at least in part on said system data.

5. The method of claim 1, further comprising the steps of:

generating test information for each modeled system component, the test information for each modeled system component comprising an output generated after providing a testing input to such modeled system component; and associating each modeled system component with the test information for such modeled system component.

6. The method of claim 1, further comprising the step of:

predicting a future outcome, and a measure of impact of the future outcome, using the bound system and the model-based diagnostic interface.

7. The method of claim 1, wherein the model information comprises system component hierarchical information, system structural hierarchical information, and data schema information.

8. The method of claim 1, wherein the step of determining one or more system failures comprises the steps of:

identifying a plurality of failure modes in the system; and selecting, from the failure modes, one or more likely failure modes corresponding to the system data, telemetry, and the bound system.

9. The method of claim 8, wherein the step of determining one or more root causes for each of the likely failure modes comprises the steps of:

determining one or more initial causes for one or more of the likely failure modes;

comparing the one or more initial causes to one or more likely causes; and determining the one or more root causes, based on the comparison of the one or more initial causes to the one or more likely causes.

10. The method of claim 9, wherein the step of comparing the one or more initial causes to the one or more likely causes comprises using multiple methods that include at least one of the following: historical data analysis, off-line reasoning, human analysis, and data mining techniques.

11. The method of claim 9, further comprising the steps of:

determining a measure of impact for one or more of the likely failure modes;

determining remaining system capabilities, based at least in part on the measure of impact; and determining a recommended corrective action, based at least in part on the measure of impact and the remaining system capabilities.

12. The method of claim 11, further comprising the step of:

storing the following historical data: one or more failure modes, one or more root causes, one or more measures of impact, the remaining system capabilities, and the recommended corrective action.

13. The method of claim 1, further comprising the steps of:

generating a model for each of a plurality of system components;

associating the plurality of modeled system components with one another; and generating telemetry for, and associating the telemetry with, each modeled system component, the telemetry for each modeled system component comprising data indicating at least a status of the modeled system component.

14. An apparatus comprising:

(a) a processor;

(b) a memory coupled to the processor; and (c) a program residing in the memory and executable by the processor, the program including a diagnostic interface for a system having system data representing a status of said system, system information relating to relationships within said system, and having a hierarchical system model that includes a model nomenclature representation of the system information, model information and nomenclature, system failure mode information and nomenclature, and telemetry information and nomenclature, the program configured to:

map the system information, the model information and nomenclature, the system failure mode information and nomenclature, and the telemetry information and nomenclature into a binding function, using the model nomenclature representation;

bind the system information, the model information and nomenclature, the system failure mode information and nomenclature, and the telemetry information and nomenclature using the binding function, to thereby generate a bound system;

generate an optimized model-based diagnostic interface for runtime execution, using the bound system;

determine one or more system failures, using the bound system and the optimized model-based diagnostic interface; and determine a root cause of one or more of the systems failures, using the bound system and the optimized model-based diagnostic interface.

15. The apparatus of claim 14, further comprising an input coupling to a source of said system data.

16. The apparatus of claim 14, wherein the model nomenclature comprises a language for expressing a system in a systems modeling environment, said language comprising tokens that can be manipulated by modeling software, wherein said tokens include at least one of an icon, a variable name, an element name, a component name, a format, and a relationship identifier.

17. The apparatus of claim 14, wherein the program is further configured to:

predict a future outcome, and a measure of impact of the future outcome, using the bound system and the model-based diagnostic interface.

18. The apparatus of claim 14, wherein the model information comprises system component hierarchical information, system structural hierarchical information, and data schema information.

19. The apparatus of claim 14, wherein the program is further configured to:

identify a plurality of failure modes in the system; and select, from the failure modes, one or more likely failure modes corresponding to the system data, telemetry, and the bound system.

20. The apparatus of claim 14, wherein the program is further configured to:

determine one or more initial causes for one or more likely failure modes;

compare the one or more initial causes to one or more likely causes; and determine the one or more root causes, based on the comparison of the one or more initial causes to the one or more likely causes.

21. The apparatus of claim 14, wherein the program is configured to compare one or more initial causes to one or more likely causes using multiple methods that include at least one of the following: historical data analysis, off-line reasoning, human analysis, and data mining techniques.

22. The apparatus of claim 14, wherein the program is further configured to:

determine a measure of impact for one or more of the likely failure modes;

determine remaining system capabilities, based at least in part on the measure of impact; and determine a recommended corrective action, based at least in part on the measure of impact and the remaining system capabilities.

23. The apparatus of claim 14, wherein the diagnostic interface comprises at least one computational object producing an output responsive to said system data, wherein said at least one computational object includes a binding to said system information of said system data mapped to said model nomenclature.

24. The apparatus of claim 14, wherein the hierarchical system model includes an association of a plurality of modeled system components with one another, and an association of each modeled system component with telemetry, the telemetry associated with each modeled system component comprising data indicating the status of the modeled system component.

25. A program product comprising:

a model-based diagnostic interface program comprising at least one object binding mapped system data to system information relating to relationships within said system, wherein said mapped system data includes system data that has been mapped to a model nomenclature of a hierarchical model of said system, said at least one object executable to produce an input to a diagnostic engine responsive to system data, the hierarchical system model including a model nomenclature representation of the system information, model information and nomenclature, system failure mode information and nomenclature, and telemetry information and nomenclature, the model-based diagnostic interface program configured to:

map the system information, the model information and nomenclature, the system failure mode information and nomenclature, and the telemetry information and nomenclature into a binding function, using the model nomenclature representation;

bind the system information, the model information and nomenclature, the system failure mode information and nomenclature, and the telemetry information and nomenclature using the binding function, to thereby generate a bound system;

generate an optimized model-based diagnostic interface for runtime execution, using the bound system;

determine one or more system failures, using the bound system and the optimized model-based diagnostic interface; and determine a root cause of one or more of the systems failures, using the bound system and the optimized model-based diagnostic interface; and a non-transitory computer-readable media bearing the model-based diagnostic interface program.

26. The program product of claim 25, wherein said at least one object is linkable to an integrated vehicle health management system.

27. The program product of claim 25, wherein the model nomenclature comprises a language for expressing a system in a systems modeling environment, said language comprising tokens that can be manipulated by modeling software, wherein said tokens include at least one of an icon, a variable name, an element name, a component name, a format, and a relationship identifier.

28. The program product of claim 25, wherein the model information comprises system component hierarchical information, system structural hierarchical information, and data schema information.

29. The program product of claim 25, wherein the model-based diagnostic interface program is further configured to:

identify a plurality of failure modes in the system; and select, from the failure modes, one or more likely failure modes corresponding to the system data, telemetry, and the bound system.

30. The program product of claim 25, wherein the model-based diagnostic interface program is further configured to:

determine one or more initial causes for one or more likely failure modes;

compare the one or more initial causes to one or more likely causes; and determine the one or more root causes, based on the comparison of the one or more initial causes to the one or more likely causes.

31. The program product of claim 25, wherein the model-based diagnostic interface program is configured to compare the one or more initial causes to one or more likely causes using multiple methods that include at least one of the following: historical data analysis, off-line reasoning, human analysis, and data mining techniques.

32. The program product of claim 25, wherein the model-based diagnostic interface program is further configured to:

determine a measure of impact for one or more of likely failure modes;

determine remaining system capabilities, based at least in pa part on the measure of impact; and determine a recommended corrective action, based at least in part on the measure of impact and the remaining system capabilities.

* * * * *